F. X. MUDD.
SHOCK ABSORBER.
APPLICATION FILED OCT. 23, 1913.
1,098,826.
Patented June 2, 1914.
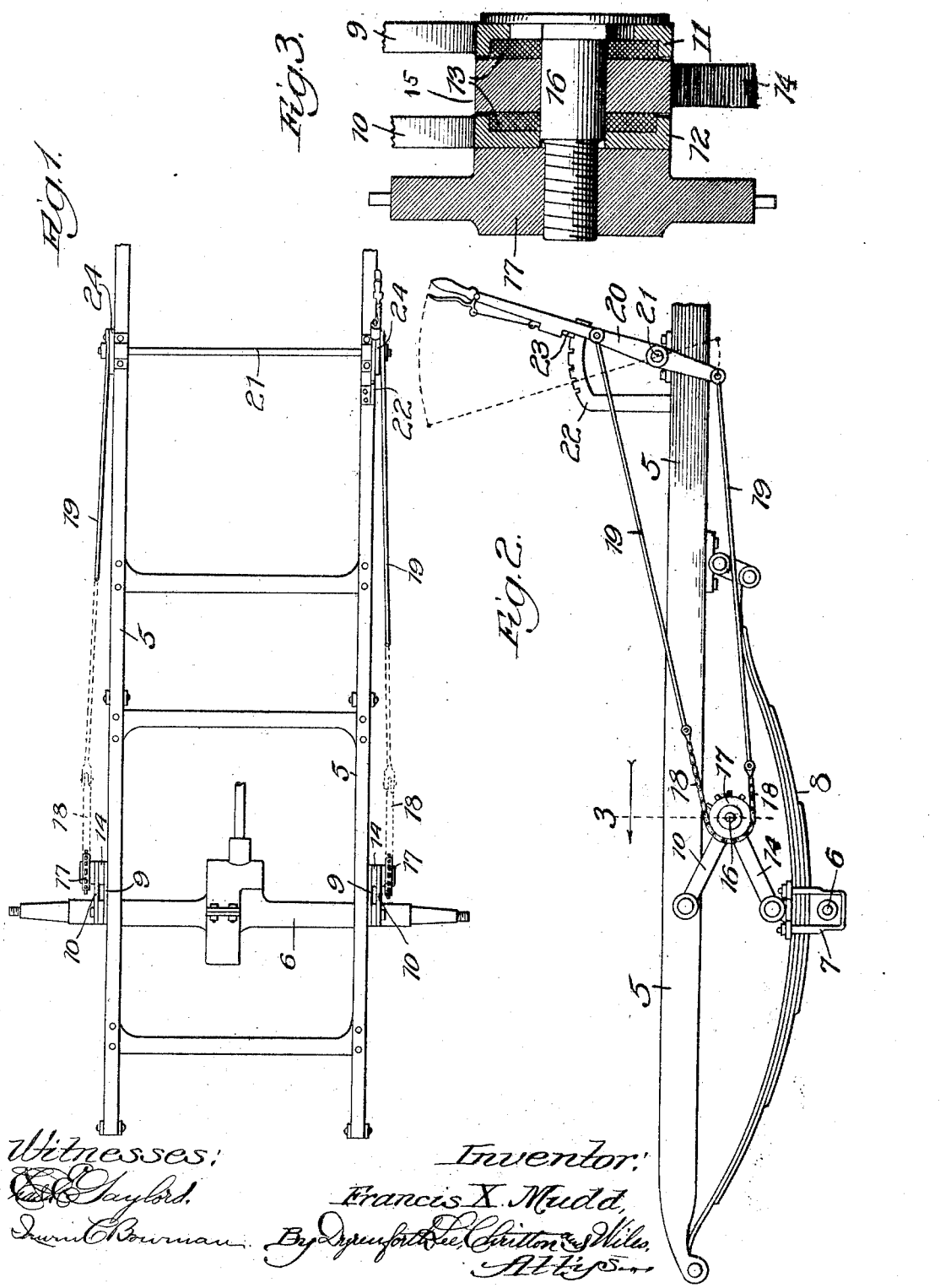

UNITED STATES PATENT OFFICE

FRANCIS X. MUDD, OF CHICAGO, ILLINOIS.

SHOCK-ABSORBER.

1,098,826.  Specification of Letters Patent.  Patented June 2, 1914.

Application filed October 23, 1913. Serial No. 796,924.

*To all whom it may concern:*

Be it known that I, FRANCIS X. MUDD, a citizen of the United States, residing at Chicago, in the county of Cook and State of Illinois, have invented a new and useful Shock-Absorber, of which the following is a specification.

My invention relates to an improvement in shock-absorbers, which I have devised for use, more especially, on automobiles.

A shock-absorber, of the same general construction as that herein shown for illustrating my improvement, is in quite extensive use on automobiles, and comprises two essential members, each consisting of an arm terminating at one end in a head. In use, one arm is attached to the body and the other to the axle of the vehicle, and the disk heads meet and are fastened together at their interlocking meeting faces. This device, which is applied to each spring, or only to each rear spring, is set for permanency, as to its comparatively unyielding character, in its operative position wherein it obstructs the full resilient action of the vehicle springs desirable in riding on smooth road, just for the purpose of preventing that action on encountering rough road or in clearing obstructions or ruts, thereby to avoid undue oscillations of the vehicle body.

The object of my invention is to provide a shock-absorber which shall be normally in inoperative condition, but readily rendered operative whenever occasion arises for applying it.

In the accompanying drawings, Figure 1 is a broken plan skeleton view of the frame of an automobile equipped with my improved shock-absorber on each of its rear axle springs; Fig. 2 is an enlarged broken view of the same in side elevation, and Fig. 3 is an enlarged section on line 3, Fig. 2.

The frame 5 need contain no features of novelty. It is supported on the rear axle 6 (as it ordinarily is also on the front axle, not shown) through the medium of similar springs secured to the axle by clips 7, as shown of the spring 8 in Fig. 2. The shock-absorber, with which each spring is provided, comprises, as its preferred construction, two parallel arms 9 and 10 spaced apart and pinned at one end to a side-rail of the frame, these arms terminating at their opposite ends in corresponding annular heads 11 and 12 having oil-soaked wooden friction-disks 13 let into their inner dished faces (Fig. 3), and an arm 14 fastened at one end to a clip 7 and terminating at its opposite end in an annular metal head 15. This head extends between the heads 11 and 12; and a pin 16, passed through the three heads, connects them together and is threaded on its inner end, where it carries a sprocket 17. The sprocket is worked by a chain 18 connected at its ends by wire cables 19, or other suitable flexible medium at one side of the frame, with an operating lever 20, respectively, at opposite sides of its fulcrum. The lever-fulcrum is a rock-shaft 21 journaled in bearings on the forward part of the frame. While the operating lever is represented on an end of the shaft, it may be in any other desired position thereon. A segmental rack 22 is provided in suitable position on the vehicle-frame to be engaged by a spring-pawl 23 on the lever for locking the latter in different positions of its throw. The shock-absorber at the side of the frame opposite that presented in Fig. 2 has the cables 19 connected with the opposite ends of a cross-head 24 on the shaft, just like the lever 20 but without its upper handle-equipped section.

To set the two shock-absorbers shown on the rear axle in Fig. 1, the operating lever is thrown to the position represented in the drawing to turn the rock-shaft and actuate the sprockets to work the nuts on the threaded ends of the pins carrying them against the inner heads 12, and thereby clamp the three heads of each device into frictional engagement at their opposing faces. This engagement, which may be instantaneously effected by thus throwing the lever 23, and which is maintained so long as the lever is held in that position, tightly locks together the members of each shock-absorber to render it operative for its purpose, while by throwing the operating lever to the end of its throw in the opposite direction the parts are restored to their normally-inoperative condition. At intermediate positions between the ends of the throw of the operating lever it actuates the sprockets on the threads of the pins 16 to clamp the heads 11, 12 and 15 with lesser or greater degrees of tightness, thereby to render the shock-absorbers more or less yielding with consequent degrees of resilient action of the springs 8.

The lever 20 may be the brake-lever of the automobile, to enable the shock-absorbers to be applied with each application of the brakes. However, since it is frequently desirable to apply the shock-absorbers when not wishing to use the brakes, it is better to maintain them separately operative from the latter.

As will thus be seen, by the construction of my improved device, in its position on an automobile, it does not normally interfere with or obstruct the full resilient action of the vehicle-springs, but may be readily and quickly caused to do so to any desired degree whenever occasion arises for applying it in the manner described.

I realize that considerable variation is possible in the details of construction thus specifically shown and described, and I do not intend by illustrating a single specific or preferred embodiment of my invention to be limited thereto; my intention being in the following claims to claim protection upon all the novelty there may be in my invention as broadly as the state of the art will permit.

What I claim as new and desire to secure by Letters Patent is:

1. The combination with a vehicle having a supporting spring, of a shock-absorber interposed between the vehicle and spring and normally in inoperative condition relative to the movements of said parts, and means adapted to be operated from a distant part of the vehicle to place said shock-absorber in and out of operation.

2. The combination with a vehicle having a supporting spring, of a shock-absorber interposed between the vehicle and spring and normally in inoperative condition relative to the movement of said parts, comprising frictional shock-absorbing members normally out of frictional contact and having annular heads, a pin connecting said heads and having a threaded end, a nut working on the pin-thread, and means adapted to be operated from a distant part of the vehicle to actuate the nut to force said annular heads into frictional contact or to withdraw them therefrom.

3. A shock-absorber comprising a pair of arms having annular heads and an arm having an annular head extending between said first-named heads, a pin connecting said heads, having a threaded end, and a nut working on the pin-thread and provided with a sprocket by which to turn the nut for releasably clamping the heads together.

4. In an automobile, shock-absorbers each comprising arms secured, respectively, to the vehicle-frame and to an axle at the springs thereon and terminating in annular heads, a pin connecting the annular heads, having a threaded end, and a nut working on the pin-thread and provided with a sprocket, a rock-shaft journaled in the forward part of said frame and carrying an operating lever, chain-connections between the sprockets and said shaft, a segmental rack supported on the shaft near said lever, and a pawl on the operating lever to coöperate with said rack, for the purpose set forth.

FRANCIS X. MUDD.

In presence of—
  D. C. Thorsen,
  O. C. Avisus.